United States Patent [19]

Vanderlaan et al.

[11] Patent Number: 4,533,891

[45] Date of Patent: Aug. 6, 1985

[54] LIMITED ANGLE TORQUE MOTOR

[75] Inventors: Robert D. Vanderlaan; John W. Meulendyk, both of Kalamazoo, Mich.

[73] Assignee: Pneumo Corporation, Boston, Mass.

[21] Appl. No.: 482,769

[22] Filed: Apr. 7, 1983

[51] Int. Cl.$^3$ ............................................. H01F 7/08
[52] U.S. Cl. ...................................... 335/272; 310/29; 310/36; 310/80
[58] Field of Search ................. 310/36, 38, 156, 86, 310/87, 80, 83, 29; 335/272, 229, 230

[56] References Cited

U.S. PATENT DOCUMENTS

| | | | |
|---|---|---|---|
| 2,956,188 | 10/1960 | White | 310/86 |
| 3,435,393 | 3/1969 | Meisel | 310/36 X |
| 3,471,725 | 10/1969 | Moret et al. | 310/36 |
| 3,495,111 | 2/1970 | Haydon | 310/86 X |
| 3,644,763 | 2/1972 | Skrobisch | 310/36 |
| 3,900,749 | 8/1978 | Carriker | 310/186 |
| 3,911,300 | 10/1975 | Lebkuchner | 310/86 |

*Primary Examiner*—Donovan F. Duggan
*Attorney, Agent, or Firm*—Maky, Renner, Otto & Boisselle

[57] ABSTRACT

A two pole stationary coil rotary magnet motor which provides for increased work and reduced rotary inertia. The motor consists of two main assemblies, a rotor assembly contained within a rotor casing and a stator and housing assembly surrounding the rotor casing. One end of the casing is closed, whereas the other end is open to eliminate the need for a dynamic shaft seal. Fluid enters the casing at the open end thereof to provide a lubricating fluid for the rotor bearings and a heat conductive path. The rotor casing isolates the critical movement of the rotor from the contaminated atmosphere of the stator environment and allows replacement of the stator assembly without disturbing the rotor assembly. A permanent magnet rotor may be formed using one or more rare earth magnets which may be suitably bonded to the rotor shaft. A protective cover surrounds the rotor magnets to eliminate potential rotor magnet breakage contamination. The relationship between the rotor magnet angle and stator winding may be such as to produce a relatively large output work potential. Also, the lamination slot configuration and stator winding may be graded to optimize the torque versus rotation profile to more closely match the cosine function of various rotary to linear output gearing to provide a substantially constant force output.

10 Claims, 2 Drawing Figures

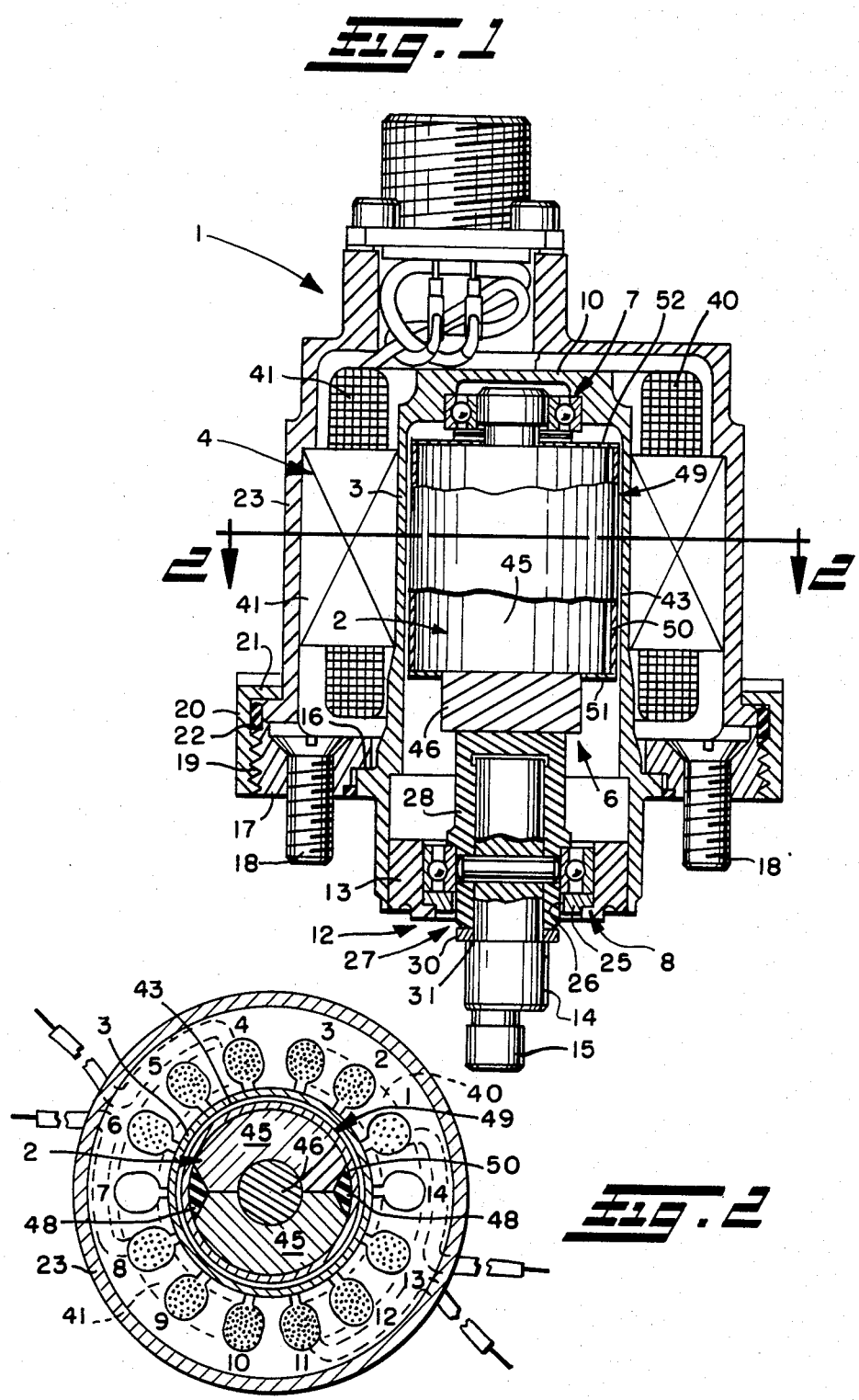

LIMITED ANGLE TORQUE MOTOR

This invention relates generally as indicated to a limited angle torque motor especially for use in directly driving a valve in a high pressure fluid proportional servo control system.

BACKGROUND OF THE INVENTION

In certain types of high pressure fluid proportional servo control systems, in which the fluid pressure may for example be on the order of 1,000 psi or more, it has been found advantageous to use a limited angle torque motor for directly driving a proportional control valve of relatively short stroke. Such a system is less complex and costly than other systems that utilize electro-hydraulic valves (EHV) to control such valve movements, in that it eliminates the need for hydromechanical failure monitors, and also eliminates EHV null flow losses and the like. Moreover, there is a substantial weight savings, and less heat exchanger requirements are needed. However, the particular motor design must be highly reliable and relatively maintenance free. Also, the motor should desirably provide the required work output with minimum power requirements.

SUMMARY OF THE INVENTION

The motor of the present invention provides a precision proportional output motion as a function of electrical current free of backlash. Preferably such motor is a two pole stationary coil rotary magnet design which maximizes work and minimizes rotary inertia. In accordance with the invention, the relationship between the rotor magnet angle and stator winding may be such that it provides a relatively large output work potential. Also, the lamination slot configuration and stator windings may be graded to optimize the torque versus rotation profile by achieving a desired cosine relationship between the applied motor current and torque as a function of the rotational angle to more closely match the normal cosine function of various rotary to linear output gearing to provide a substantially constant force output.

Further in accordance with the invention, a permanent magnet rotor may be formed using one or more rare earth magnets suitably bonded to the rotor shaft. Also, a protective cover may be provided around the rotor magnets to eliminate potential rotor magnet breakage contamination.

Also in accordance with the invention, a plurality of fully isolated coils may be provided to obtain multiple channel electronic redundancy.

Still further in accordance with the invention, the motor includes a two piece final assembly consisting of a stator assembly and a rotor assembly which allows replacement of the stator assembly without disturbing the rotor assembly.

Further in accordance with the invention, the rotor shaft bearings are supported by a common rotor casing structure. Also, one end of the rotor casing is closed and the other end is open to eliminate the need for a dynamic shaft seal. Fluid enters the rotor casing through the open end for lubricating the rotor shaft bearings and provides heat conductive path for the stator winding hot spots through the thermally conductive rotor casing and contained fluid while the stator itself is kept dry.

In accordance with another aspect of the invention, the fluid entrance to the rotor casing may be filtered by a close clearance gap seal. Also, a magnetic filter trap may be provided at the fluid entrance point to reduce further the chance of any magnetic contaminants from entering the casing through the filter gap.

Also in accordance with the invention, the various motor parts adjacent the fluid entrance to the rotor casing are desirably made of substantially nonmagnetic materials to interrupt the magnetic flux paths otherwise tending to attract magnetic contaminants toward the motor and reduce magnetization of the critical valve elements protecting against collection of magnetic particles at the valve metering orifices and the like.

Further in accordance with the invention, the rotor casing desirably has high electrical conductivity to provide significant eddy current damping.

To the accomplishment of the foregoing and related ends, the invention, then, comprises the features hereinafter fully described and particularly pointed out in the claims, the following description and the annexed drawing setting forth in detail a certain preferred embodiment of the invention, this being indicative, however, of but one of the various ways in which the principles of the invention may be employed.

BRIEF DESCRIPTION OF THE DRAWING

In the annexed drawing:

FIG. 1 is an enlarged longitudinal sectional view through a preferred form of limited angle torque motor in accordance with the present invention; and FIG. 2 is a reduced transverse section through the motor of FIG. 2 showing the rotor magnet details and stator laminations.

DETAILED DESCRIPTION OF THE PREFERRED EMBODIMENT

Referring now in detail to the drawing and initially to FIG. 1 thereof, a preferred form of limited angle torque motor in accordance with the invention is generally indicated by the reference numeral 1. A limited angle torque motor is desirably used to keep the circuit simple and avoid the need for commutation. Such motor is primarily intended for use in high pressure fluid systems in which the fluid pressure may be on the order of 1,000 psi or more, and may be used for directly driving a valve in proportional servo control systems including but not limited to aircraft controls. However, it will be appreciated that the motor may be used in other applications as well.

Preferably, such motor consists of two main assemblies, a rotor assembly 2 contained within a rotor casing 3 and a stator and housing assembly 4 surrounding the rotor casing.

The rotor assembly 2 includes a rotor shaft 6 journal mounted within the rotor casing 3 adjacent opposite ends thereof by rotor shaft bearings 7, 8 suitably supported by common casing structure. One end 10 of the casing is closed, whereas the other end 12 is open to permit connection of the rotor shaft to a valve member or other mechanism through a suitable linkage, not shown. A bearing retainer 13 may be welded or otherwise secured within the open end of the rotor casing 3 to prevent disassembly of the rotor assembly from the casing. A drive shaft 14 having on the outer end thereof an eccentric 15 or other suitable form of rotary to linear gearing that preferably drives through a cosine characteristic may be suitably connected to the rotor shaft to translate the rotary movement of the rotor shaft to linear movement of the drive linkage.

A shoulder 16 may be provided on the O.D. of the rotor casing 3 spaced a short distance from the open end thereof for engagement by a holddown member 17 which may be used to clamp the rotor casing to a valve housing or other support structure, not shown, as by means of mounting bolts 18. Also, the holddown member may have an annular external threaded surface 19 to permit the stator and housing assembly 4 to be removably attached therto by means of a threaded sleeve 20 or the like. The inner end of the sleeve 20 may have an inturned flange 21 which overlies an out-turned flange 22 on the outer end of the stator housing 23 as shown in FIG. 1. When thus assembled, the open end 12 of the rotor casing 3 may extend into an opening in the valve housing (not shown) to expose the interior of the rotor casing including the rotor assembly 2 contained therein to the valve system pressure while isolating the stator and housing assembly 4 from such system pressure.

Such a motor construction provides the advantages of a wet motor design, including eliminating the need for a dynamic shaft seal and providing a lubricating fluid in which the bearings operate, thereby reducing the mechanical threshold and hysteresis to a minimum. At the same time, the rotor casing isolates the critical movement of the rotor assembly from the potentially contaminated atmosphere exteriorly of the rotor casing while keeping the stator and housing assembly 4 dry without the need for a dynamic seal or lead wire header. This allows replacement of the stator and housing assembly without disturbing the rotor assembly.

From the foregoing, it will be apparent that such a rotor casing provides an efficient interface structure between the fluid and motor environments as well as a high pressure containment with minimum weight to space requirements. In addition, the thermal conduction of the rotor casing and contained fluid provide an excellent heat conductive path between the stator winding hot spots and valve housing heat sink to which the motor is attached. Moreover, the rotor casing is desirably made of a material having high electrical conductivity such as beryllium copper which provides significant eddy current damping for system dynamic requirements and is also sufficiently strong to hold the pressure. Additional support for the rotor casing 3 is provided by the surrounding stator and housing assembly 4, thus reducing the strength requirements of the casing in order to contain the internal fluid pressure.

To protect against the possibility of any foreign material entering the rotor casing along with the hydraulic operating fluid, a low clearance gap seal 25 having a minimum clearance 26 for example in the range of 0.004 inch or less with the rotor shaft 6 may be provided at the fluid entrance 27 to the rotor casing to filter the fluid passing through such gap seal. Preferably, the seal 25 is made out of a suitable compliant, jam tolerant seal material.

Also, the various end parts of the rotor and stator assemblies closest to the fluid entrance 27 to the rotor casing are desirably made out of substantially non-magnetic materials which not only interrupt the magnetic flux paths otherwise tending to attract magnetic contaminants toward the motor but also reduce magnetization of critical elements of the motor drive valve protecting against collection of magnetic particles at the valve metering orifices and the like. This would include, for example, the holddown member 17 and associated mounting bolts 18, the sleeve 20, the rotor casing 3, the outer end 28 of the rotor shaft 6, the drive shaft 14 and associated eccentric 15, the bearing retainer 13, and gap seal 25.

The holddown member 17 and associated mounting bolts 18 as well as the outer end 28 of the rotor shaft 6 and drive shaft 14 may, for example, be made out of various types of stainless steel, whereas the rotor casing 3 and bearing retainer 13 are desirably made out of beryllium copper. The sleeve 20 is desirably made out of aluminum. However, it will be appreciated that other suitable substantially non-magnetic materials may be used to make these parts.

Also, an external magnetic filter trap, for example, in the form of a permanent magnet washer 30 is preferably mounted on a shoulder 31 on the drive shaft 14 adjacent the outer end of the rotor shaft near the fluid entrance point 27 to the rotor casing to reduce further the chance of any magnetic contaminants from entering the filter gap 26.

A two pole motor should be utilized whenever it is desired to obtain a relatively large work output and/or a substantially uniform work output. Such a motor produces a relatively high torque output over a relatively large excursion of the rotor shaft. For example, the useful torque output of a two pole motor only drops off approximately 50% of the maximum torque output at plus or minus 60° of rotation of the rotor shaft, whereas the useful torque output of a four pole motor drops off to approximately 50% at plus or minus 30° of rotation.

Moreover, it has been found that the stator windings of a two pole motor can be graded to optimize the torque versus rotation profile in order to achieve a substantially cosine relationship between the applied motor current and the rotational angle to complement the cosine function that an eccentric or other such simple form of rotary to linear gearing tends to follow to produce a substantially constant force output over a relatively large excursion of the rotor shaft.

Plural isolated coils having the identical output torque versus rotation characteristic may also be provided for achieving plural channel electronic redundancy. In the preferred embodiment shown herein, two such alternate dual coil windings 40, 41 are provided for obtaining two channel electronic redundancy. However, it should be understood that three or four channel windings may also be provided for obtaining additional redundancy if desired. If one coil or its associated electronics should fail, its counterpart channel will maintain control by equalizing the failed channel force effect. The ability to sense which channel has failed may be provided for in the failure monitoring electronics such that when detected, the failed channel is decoupled and made passive.

One form of motor construction in accordance with the present invention including a dual coil design with graded windings for producing a torque versus rotation profile to more closely match the cosine function of the output gearing to provide a substantially constant force output is shown in FIG. 2. Such motor has a magnet angle of approximately 140°. If the stator laminations have fourteen uniformly spaced slots numbered 1 through 14 as indicated, the windings should be graded so that the slots numbered 1, 6, 8 and 13 are provided with a relatively few number of turns (for example twenty turns), slots numbered 2, 5, 9 and 12 are provided with an intermediate number of turns (for example, forty turns), and slots numbered 3, 4, 10 and 11 are provided with the most turns (for example, fifty turns). In the embodiment shown, slots numbered 7 and 14 have no turns and could be eliminated altogether if desired.

Indeed, stator laminations having a greater or lesser number of slots, either uniformly spaced or non-uniformly spaced, could also be utilized, but in that event a different graded winding pattern would be required in order to optimize the force versus rotation profile to more closely match the cosine function of the output gearing to provide the desired substantially constant force output as aforesaid.

Referring further to FIG. 2, the windings for coil 40 desirably start with slot 1 and end up with slot 11, whereas the windings for coil 41 desirably start with slot 8 and end up with slot 4 as shown. Also, when winding coil 40, the desired number of turns are first preferably wound between slots 1 and 13, then between slots 2 and 12, and finally between slots 3 and 11. Similarly, when winding coil 41, the desired number of turns are first preferably wound between slots 8 and 6, then between slots 9 and 5, and finally between slots 10 and 4.

Since the coil windings are in the stator, the rotor magnetic flux gap between the stator and rotor must be relatively large in order to accommodate both the flux path clearance 43 between the rotor 2 and rotor casing 3 and the thickness of the rotor casing and protective cover 49 surrounding the rotor magnets 45 as described in greater detail hereafter. Due to mechanical considerations, the flux path clearance should be at least twice the size of the gap seal clearance 26. Also, the rotor magnet flux gap, including the flux path clearance 43 and rotor casing and protective cover, may have a radial dimension on the order of 0.050 inch.

For the motor to operate efficiently, the rotor magnets 45 are desirably rare earth magnets. Such a permanent magnet rotor may be formed using one or more rare earth magnets suitably bonded to the rotor shaft. In the form shown in FIG. 2, a pair of permanent magnets 45 are bonded to opposite sides of the main portion 46 of the rotor shaft 6. Such rotor shaft main portion 46 is made of a suitable magnetic material such as magnetic iron, and the outer end 28 of the rotor shaft may be attached to one end of the rotor shaft main portion as by welding.

The inner surfaces of the magnets should be of a shape corresponding to the shape of the surface of the rotor shaft to which they are bonded. Also, each magnet desirably encompasses a magnet angle of approximately 140° as aforesaid. The ends of each magnet desirably contact each other in line with the cross-sectional axis of the rotor shaft, and the outer surfaces of the magnets are desirably curved to provide a generally cylindrical outer surface except for the spaces between the ends of each magnet which may be filled with non-magnetic wedge shape inserts or epoxy filler 48 to complete the cylindrical outer surface. Because such rare earth magnets are extremely brittle, the magnets are also preferably contained within a protective cover 49 to prevent potential rotor magnet breakage contamination. Such protective cover may consist, for example, of a rotor sleeve 50 suitably bonded to the outer surface of the magnets and a pair of magnet retainers 51, 52 bonded to the magnets at opposite axial ends thereof as shown in FIG. 1.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. A limited angle torque motor comprising a rotor assembly, a rotor casing surrounding said rotor assembly, and a stator assembly extending over one end of said rotor casing, said rotor casing being closed at said one end and open at its other end to permit operating fluid to enter said rotor casing through said other end, and connecting means for removably connecting said stator assembly to said rotor casing thereby permitting replacement of said stator assembly without distrubing said rotor assembly, said rotor casing having an external shoulder adjacent said other end engageable by a holddown member which is used to attach said rotor casing to a support structure, and said connecting means comprising a sleeve member for connecting said stator assembly to said holddown member.

2. The motor of claim 1 wherein said holddown member and sleeve member have engageable threaded surfaces, and said sleeve member and stator assembly have overlapping flange surfaces engageable with each other.

3. The motor of claim 1 wherein said rotor assembly includes a rotor shaft journaled in rotor shaft bearings supported by a common structure of said rotor casing, and a bearing retainer attached to said other end of said rotor casing to prevent disassembly of said rotor assembly from said rotor casing.

4. The motor of claim 1 wherein said rotor assembly includes a rotor shaft journaled in rotor shaft bearings, rare earth magnet means attached to said rotor shaft, and a protective cover completely surrounding said magnet means, the outer surface of said magnet means providing a generally cylindrical surface, and said protective cover including a rotor sleeve bonded to said cylindrical surface, and a pair of separate magnet retainers bonded to opposite axial ends of said magnet means.

5. The motor of claim 1 wherein said rotor assembly includes a rotor shaft journaled in rotor shaft bearings supported by a common structure of said rotor casing, and there is a close clearance gap seal made of a compliant, jam tolerant material at the fluid entrance to said open other end of said rotor casing between said rotor casing and said rotor shaft.

6. The motor of claim 5 wherein the various end parts of said motor adjacent the fluid entrance to said rotor casing are made out of substantially non-magnetic materials.

7. The motor of claim 6 further comprising a magnetic filter trap adjacent said open other end of said rotor shaft near the fluid entrance to said rotor casing.

8. The motor of claim 1 wherein said rotor assembly includes magnet means defining two magnet poles, and gearing means for converting the rotary output of said rotor assembly to a linear output force, said gearing means having a substantially cosine function, and said stator assembly having graded winding means for achieving a substantially cosine relationship between the applied motor current and the rotational angle of said rotor assembly to complement the substantially cosine function of said gearing means to provide a substantially constant output force from said motor for a given current level.

9. A two pole limited angle torque motor comprising a rotor assembly and a stator assembly, said rotor assembly including magnet means defining two magnet poles, and output gearing means for converting the rotary output of said rotor assembly to a linear output force, said gearing means having a substantially cosine function, and said stator assembly having graded winding means for achieving a substantially cosine relationship between the applied motor current and the rotational angle of said rotor assembly to complement the substantially cosine function of said output gearing means to provide a substantially constant output force for a given current level over a relatively large rotational angle excursion of said rotor assembly.

10. The motor of claim 9 wherein said magnet means has a magnet angle of approximately 140°, and said motor produces a substantially constant force output over approximately plus or minus 60° of rotation of said rotor assembly.

* * * * *